United States Patent [19]

Honjo et al.

[11] Patent Number: 4,753,668
[45] Date of Patent: Jun. 28, 1988

[54] METHOD OF CORRECTING THE ATTITUDE OF AN ARTICLE BEING CONVEYED

[75] Inventors: Seiichiro Honjo; Atsushi Miyake, both of Osaka, Japan

[73] Assignee: Nippon Sheet Glass Co., Ltd., Osaka, Japan

[21] Appl. No.: 101,811

[22] Filed: Sep. 28, 1987

[30] Foreign Application Priority Data

Sep. 29, 1986 [JP] Japan .................... 61-230422

[51] Int. Cl.⁴ ............................................. C03B 35/00
[52] U.S. Cl. .......................................... 65/29; 65/104; 65/106; 65/273; 65/163; 198/460; 198/461; 198/575; 198/577
[58] Field of Search ................. 65/104, 106, 273, 163, 65/286, 29; 198/577, 575, 460, 461

[56] References Cited

U.S. PATENT DOCUMENTS

| | | | |
|---|---|---|---|
| 3,662,871 | 5/1972 | Koepnick | 198/460 X |
| 3,774,748 | 11/1973 | Dederer et al. | 198/460 X |
| 3,992,182 | 11/1976 | Frank | 65/163 |
| 4,437,872 | 3/1984 | McMaster et al. | 65/106 X |
| 4,475,937 | 10/1984 | Nitschke | 65/163 |
| 4,493,412 | 1/1985 | Krehnovi | 65/163 |
| 4,690,269 | 1/1987 | Takao | 198/460 |

Primary Examiner—Arthur Kellogg
Attorney, Agent, or Firm—Bogucki, Scherlacher, Mok & Roth

[57] ABSTRACT

A method of correcting the attitude of an article being conveyed in a feed system including two second feed paths for receiving the article from a first feed path and feeding the article so that a first part and a second part, which are related to each other, of the article will reach a target position for each of the first and second parts. The attitude of the article is corrected until the target positions are reached by compensating for a relative shift beyond a predetermined distance in a feeding direction between the first part and the second part of the article on the first feed path. The method comprises the steps of determining the extent of the relative shift by detecting times when the first part and the second part of the article pass respectively through a first measuring point and a second measuring point in the first feed path, and controlling respective speeds of feed by the second feed paths based on the detected extent of the relative shift for thereby causing each of the first part and the second part to reach the target position at a prescribed time.

11 Claims, 4 Drawing Sheets

METHOD OF CORRECTING THE ATTITUDE OF AN ARTICLE BEING CONVEYED

BACKGROUND OF THE INVENTION

1. Field of the Invention

The present invention relates to a method of correcting the attitude of an article being conveyed, and more particularly to a method of correcting the attitude of an article being conveyed which is transferred from a first feed path to two second feed paths.

2. Description of the Relevant Art

There is known a glass sheet shaping system for pressing a glass sheet to shape. In such a system, the glass sheet is heated to a temperature near its softening point by a heating furnace, and then conveyed along a feed path to pressing molds, which then press the glass sheet to shape. After the glass sheet has been shaped, it is delivered from the pressing molds to a suitable position such as for loading the glass sheet to a pallet.

It is customary to press a pair of mutually symmetrical glass sheets such as automotive side window glass sheets simultaneously with mutually symmetrical pressing molds. The pair of glass sheets is delivered from a heating furnace by a common first feed path to two second feed paths for the pressing molds. The first feed path comprises, for example, a plurality of rotatable rollers which can rotate at a prescribed speed. Where the pressing molds are annular ring molds disposed horizontally for pressing the peripheral edge of a glass sheet, each of the second feed paths comprises rotatable rollers positioned vertically movably in the ring mold and rotatable at the same speed as the above prescribed speed. The speed of rotation of the rotatable rollers of the first and second feed paths starts being reduced at a time upon elapse of a given period of time after one of the glass sheets has passed a certain position in the first feed path. At such a time, more than half of the glass sheets overlap the lower mold members of the respective lower ring molds. The rotatable rollers of the second feed paths are lowered before their speed is lowered to zero, so that the glass sheets are left on the respective lower ring mold members in registry therewith which serve as target positions. Then, the glass sheets are pressed by downward movement of the upper mold members of the respective ring molds. Subsequently, the glass sheets are delivered from the pressing molds to the loading position or other desired position. The speed at which the glass sheets are delivered by the first and second feed paths is controlled by a control unit.

When the paired glass sheets as they are heated in the heating furnace may be brought out of synchronism in the feeding direction when they are fed out of the heating furnace. More specifically, one of the glass sheet may be shifted back and forth with respect to the other glass sheet that serves to provide a reference position. The glass sheets may be thus shifted relative to each other for the reason that they are required to travel a relatively long distance through the heating furnace. More specifically, the pair of glass sheets is fed along by rotating rollers in the heating furnace. The longer the heating furnace, the greater the amount the glass sheets are shifted due to mechanical factors such as friction of the rotating rollers. Where the amount of shift of the glass sheets is large, the glass sheets may not be simultaneously transferred from the first feed path to the second feed paths. As a result, the glass sheets may not be simultaneously placed on the lower ring mold members in registry therewith in the normal control sequence of the speed control unit.

The above problem may also be caused when a wide article is fed over a first feed path in a direction normal to the width of the article and then transferred from the first feed path to two second feed paths.

The present invention has been made in an effort to correct the attitude of an article such as a glass sheet being conveyed through a system such as a glass sheet shaping system.

SUMMARY OF THE INVENTION

It is an object of the present invention to provide a method of correcting the attitude of an article being conveyed along a first feed path and then transferred therefrom to two second feed paths, the method being capable of compensating for an amount of shift caused between two related parts of the article beyond a prescribed distance in the direction in which the article is fed, when the article is fed out onto the first feed path, and hence even if the two related parts of the article may not be transferred from the first feed path to the second feed paths at respective prescribed times.

To accomplish the above object, there is provided a method of correcting the attitude of an article being conveyed in a feed system including a first feed path for feeding the article in a feeding direction, and two second feed paths contiguous to the first feed path for receiving the article from the first feed path and feeding the article so that a first part and a second part, which are related to each other, of the article will reach a target position for each of the first and second parts, the attitude of the article being corrected until the target positions are reached by compensating for a relative shift beyond a predetermined distance in the feeding direction between the first part and the second part of the article on the first feed path, the method comprising the steps of determining the extent of the relative shift by detecting times when the first part and the second part of the article pass respectively through a first measuring point and a second measuring point in the first feed path, and controlling respective speeds of feed by the second feed paths based on the detected extent of the relative shift for thereby causing each of the first part and the second part to reach the target position at a prescribed time.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
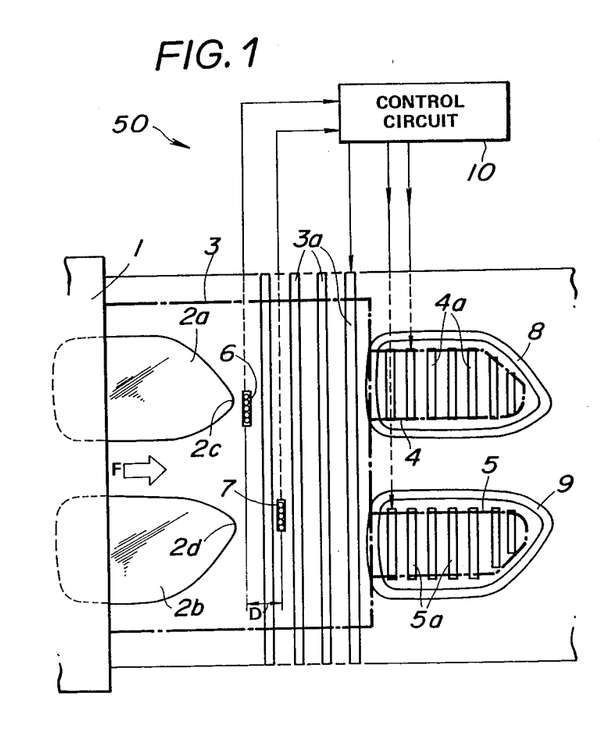
FIG. 1 is a schematic fragmentary plan view, partly in block form, of a feed system for carrying out a method of correcting the attitude of an article being conveyed according to a preferred embodiment of the present invention.

FIG. 1 illustrates a feed system 50 having a feed speed control circuit or device 10, the feed system 50 including a heating furnace 1 for heating an article in the form of a pair of mutually symmetric automotive side window glass sheets 2a, 2b to a temperature near their softening point. The control circuit 10 comprises a microcomputer unit (hereinafter referred to as an "MCU"), not shown, including various circuits such as a CPU, a RAM, a ROM, a timer, and an interface. The window glass sheets 2a, 2b are mutually synchronously introduced into a heating furnace 1 through its inlet and then fed out of the heating furnace 1 by feed rollers (not shown). After having been heated in the heating furnace 1, the glass sheets 2a, 2b are transferred onto a first feed path 3 by which they are fed along in a direction F. The first feed path 3 comprises a plurality of rotatable rollers 3a spaced at equal intervals and having axes extending perpendicularly to the feeding direction F. The first feed path 3 has a terminal end joined to two second feed paths 4, 5 contiguous to the feed path 3. The second feed paths 4, 5 comprises a plurality of rotatable rollers 4a, 5a disposed vertically movably in the lower mold members of press-shaping ring molds 8, 9 which lie horizontally. The rollers 4a, 5a are spaced at equal intervals and have axes normal to the feeding direction F. The second feed paths 4, 5 lie parallel to each other and extend in the feeding direction F. A first optical limit switch 6 is positioned in the first feed path 3 at a location where the lefthand glass sheet 2a passes. The limit switch 6 detects when the leading end 2c of the glass sheet 2a which serves as a reference glass sheet reaches a position over the limit switch 6, and sends a detected signal to the control circuit 10. A second optical limit switch 7 is positioned in the first feed path 3 at a location where the righthand glass sheet 2b passes, the second optical limit switch 7 being displaced from the first limit switch 6 a prescribed distance D in the feed direction F. The second limit switch 7 detects when the leading end 2d of the other glass sheet 2b arrives at a position over the limit switch 7, and sends a detected signal to the control circuit 10. The distance D is selected to be larger than a predicted maximum value for an amount of shift S (described later) between the glass sheets 2a, 2b.

The rollers 3a, 4a, 5a are rotated by electric motors which are controlled by the control circuit 10 so as to control the speed V of feed by the rollers 3a, 4a, 5a. These rollers 3a, 4a, 5a are rotated at a speed V1 of feed when the glass sheets 2a, 2b are placed on the first feed path 3. The speed V of feed by the rollers 3a of the first feed path 3 is the same as the speed V of feed by the rollers 4a of the lefthand second feed path 4 at all times. The rollers 5 of the righthand second feed path 5a is vertically moved in synchronsim with the rollers 4a of the lefthand second feed path 4 at all times. The rollers 4a, 5a of the first and second feed paths 4, 5 are synchronously lowered, as described later.

Figure 2A:
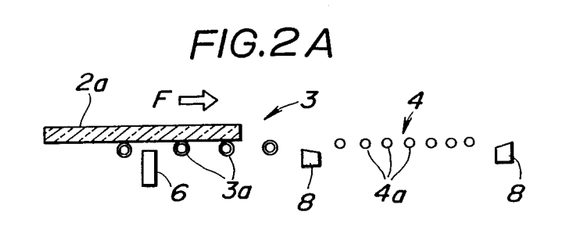
FIGS. 2A through 2C are schematic side elevational views showing successive steps of transferring an article from a first feed path to second feed paths.
Figure 2B:
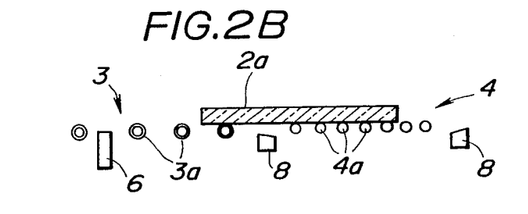
Figure 2C:
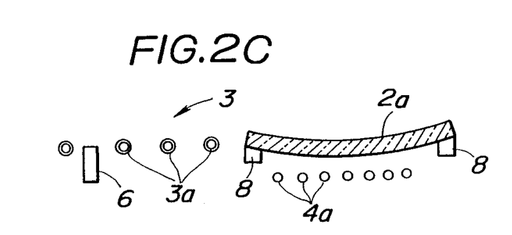
Figure 4A:
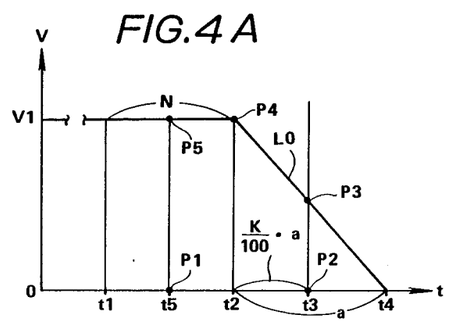
FIGS. 4A through 4C are diagrams showing changes in the speeds of the first and second feed paths, the diagrams corresponding to FIGS. 3A through 3C, respectively.

Movement of the lefthand reference glass sheet 2a will be described with reference to FIGS. 2A through 2C and 4A. The horizontal axis of the graph of FIG. 4 represents time t whereas the vertical axis thereof indicates the speed V of feed by the rollers 3a of the first feed path 3 and the rollers 4a of the lefthand second feed path 4. The speed V of feed by the rollers 3a, 4a are varied according to a characteristic curve L0 in FIG. 4. The leading end 2c of the glass sheet 2a is detected by the first limit switch 6 at a time t1. After the detection by the first limit switch 6 of the leading end 2c of the glass sheet 2a, the speed V of feed by the rollers 3a, 4a is kept at the speed V1. This condition is shown in FIG. 2A. Then, when glass sheet 2a is transferred a certain length onto the second feed path 4 as shown in FIG. 2B (at a time t2 in FIG. 4A), the rollers 3a, 4a start being decelerated at a constant rate of deceleration - V1/a. The speed V of feed by the rollers 3a, 4a reaches zero at a time t4. At a time t3 between the times t2, t4, the leading end 2c of the glass sheet 2a reaches a position just short of the front end of the ring mold 8. The rollers 4a are lowered at the time t3. The glass sheet 2a is released from the rollers 4a and the speed of movement of the glass sheet 2a becomes virtually zero. As shown in FIG. 2C, the glass sheet 2a is placed on the ring mold 8 in registry therewith which serves as a target position. Thereafter, the glass sheet 2a and the glass sheet 2b are pressed to shape by downward movement of the upper mold members (not shown) of the ring molds 8, 9. The shaped glass sheets 2a, 2b are then conveyed to a pallet (not shown).

If the glass sheet 2b is shifted a distance or an amount of shift S rearwardly of the glass sheet 2a in the feeding direction F when the glass sheets are transferred from the furnace 1 onto the first feed path 3, the amount of shift S will be compensated for at the time t3 according to a process described below, that is, the glass sheets 2a, 2b are positionally aligned in the feeding direction F at the time t3.

In FIG. 4A, the time period t2−t1 has a prescribed value N. The speed curve L0 is independent of the magnitude of the amount of shift S on a time basis. Assuming that the total time required to decelerate the rollers 3a, 3a to the speed zero is given as t4−t2=a, the time period t3−t2 can be expressed by:

$$t3 - t2 = (K/100) \cdot a$$

where K<100. The other rollers 5a are lowered at the time t3 in synchronism with the rollers 4a irrespective of the magnitude of the amount of shift S.

Figure 3A:
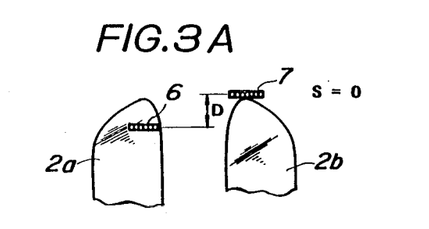
FIGS. 3A through 3C are views showing various relative shifts between a pair of articles.

If the amount of shift S is zero as shown in FIG. 3A, then the leading end 2d of the righthand glass sheet 2b is detected by the second limit switch 7 when a time interval n0 (=D/V1) corresponding to the distance D has elapsed from the time t1. The time at which the leading end 2d of the righthand glass sheet 2b is detected by the second limit switch 7 is a time t5 in FIG. 4B. The horizontal axis of the glass of FIG. 4B indicates time t and the vertical axis thereof represents the speed V of feed by the rollers 5a of the righthand second feed path 5. With the amount of shift S being zero, the speed V of feed by the rollers 5a is varied along a curve L1 which is equal to the speed curve L0. Therefore, the speed V of feed by the rollers 5a is in full synchronism with the speed V of feed by the rollers 3a, 4a. The value D/V1 of the time interval n0 is constant, and stored in the memory in the control circuit 10.

Figure 3B:
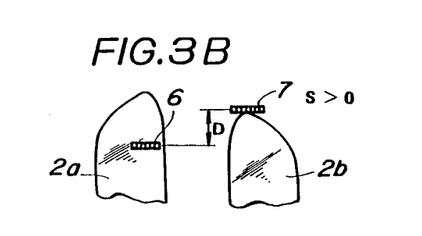

In case the amount of shift S is positive as shown in FIG. 3B, the leading end 2d of the righthand glass sheet 2b is detected by the second limit switch 7 upon elapse of a time interval n after the leading end 2c of the lefthand glass sheet 2a has been detected by the first limit switch 6. The leading end 2d of the righthand glass sheet 2b is detected by the second limit switch 7 at a time t6 in FIG. 4B. Therefore, the difference n−n0 (>0) between the time intervals n, n0 corresponds to the amount of shift S. The time interval n is measured by the timer in the control circuit 10, and the time difference n−n0 is calculated by the CPU in the control circuit 10.

Figure 4B:
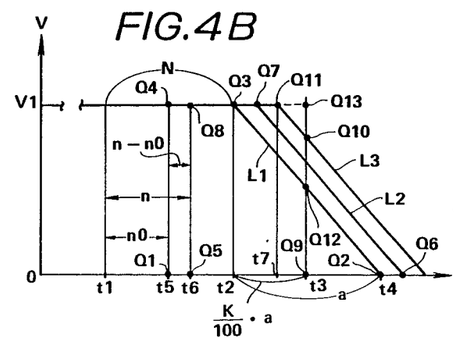

With respect to FIG. 4B, if the rollers 4a, 5a were not lowered at the time t3, then the final positions of the glass sheets 2a, 2b would be aligned with each other in the feeding direction F by delaying the time for starting to decelerate the rollers 5a by n−n0 from the time t2 along a characteristic curve L2. In FIG. 4B, $\overline{Q3Q7} = \overline{Q3Q7} = n - n0$. Stated otherwise, the distances that the glass sheets 2a, 2b are fed would be equal to each other at a time t4+(n−n0), because the distance that the glass sheet 2b, for example, is fed from a reference position is expressed by the area of a figure surrounded by the curve L1 or L2 and the horizontal axis and the area of the trapezoid Q1Q2Q3Q4 is equal to the area of the trapezoid Q5Q6Q7Q8. Therefore, the rectangle Q1Q5Q8Q4 indicative of the amount of shift S would be compensated for by the parallelogram Q2Q6Q7Q3.

In reality, however, the rollers 4a, 5a of the second feed paths 4, 5 are lowered at the time t3. Consequently, in order to align the final positions of the leading ends 2c, 2d of the glass sheets 2a, 2b at the time t3, it is necessary to further delay the time for starting to decelerate the rollers 5a thereby to equalize the area of the pentagon Q5Q9Q10Q11Q8 in FIG. 4B to the area of the pentagon P1P2P3P4P5 in FIG. 4A. That is, it is necessary to change the speed V of feed by the rollers 5a along a curve L3 and start decelerating the rollers 5a at a time t7.

Since t3−t2=(K/100)·a, as described above, the compensation by the parallelogram Q2A6Q7Q3 is effective approximately for K/100 when the time difference n−n0 is of a relatively small value. Accordingly, by starting to decelerate the rollers 5a at a time that is delayed from the time t2 by a time period equal to the product:

(n−n0)·100/K of the time difference (n−n) and the reciprocal of the efficiency K/100, the rectangle Q1Q5Q8Q4 can be compensated for by the trapezoid Q3Q12Q10Q11. Thus, the speed V of feed by the rollers 5a is varied along the curve L3. In FIG. 4B, $\overline{Q3Q11} = (n-n0)\cdot 100/K$.

Strictly, the position of the point Q11 in FIG. 4B is determined as follows:

Let it be assumed that the time interval between the points Q3 and Q11 be x. It is necessary that Rectangle Q1Q5Q8Q4=
Triangle Q3Q12Q13−Triangle Q11Q10Q13.

Therefore, $$V1 \cdot (n - n0) = (\tfrac{1}{2}) \cdot (K/100)a \cdot (k/100)V1 - \quad (1)$$
$$(\tfrac{1}{2}) \cdot [(Ka/100) - x] \cdot [(Ka/100) - x]V1/a$$

Solving the equation (1) for x, $$x = (Ka/100) - \sqrt{(Ka/100)\cdot(Ka/100) - 2a\cdot(n - n0)}.$$

According to the above equation, when n=n0, x=0. In this case, inasmuch as the point Q11 coincides with the point Q3, the curve L3 overlies the curve L1.

Figure 3C:
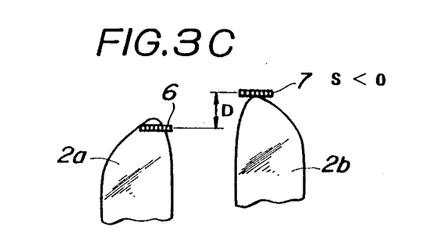

The calculated value x can practically be simplifiefd or corrected in view of mechanical characteristics of the system 50 such as about the rollers 3a, 4a, 5a.

Where the amount of shift S is negative as shown in FIG. 3C, the leading end 2d of the righthand glass sheet 2b is detected by the second limit switch 7 upon elapse of a time interval n after the leading end 2c of the lefthand glass sheet 2a has been detected by the first limit switch 6. The leading end 2d of the righthand glass sheet 2b is detected by the second limit switch 7 at a time t8 in FIG. 4C. Therefore, the difference n−n0 (<0) between the time intervals n, n0 corresponds to the amount of shift S.

Figure 4C:
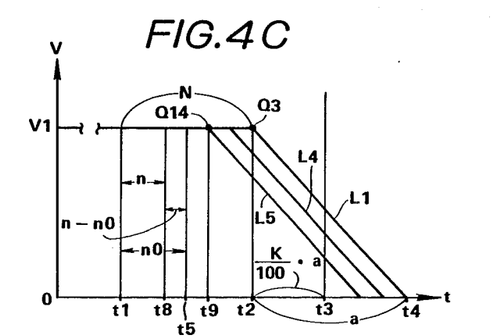

If the rollers 4a, 5a were not lowered at the time t3, then the speed of the rollers 5a would be varied according to a curve L4, which indicates that the time to start decelerating the rollers 4a would be earlier than the time t2 by n0−n (>0). Stated otherwise, the time for starting to decelerate the rollers 5a would be delayed from the time t3 by n−n0 (<0). In reality, however, the rollers 4a, 5a of the second feed paths 4, 5 are lowered at the time t3. Consequently, the time for starting to decelerate the rollers 5a is advanced as indicated by a curve L5. More specifically, the rollers 5a begin to be decelerated at a time t9 in FIG. 4C. Approximately, the point Q14 is spaced from the point Q3 by (n−n0)·100/K. Strictly, the distance x between the points Q14 and Q3 can be calculated by:

$$x = -(Ka/100) + \sqrt{(Ka/100)\cdot(Ka/100) + 2a\cdot(n - n0)}.$$

According to the above equation, when n=n0, x=0. In this case, inasmuch as the point Q14 coincides with the point Q3, the curve L5 overlies the curve L1.

The speed V of the rollers 3a, 4a is varied according to the curve L0 and the speed V of the rollers 5a is varied according to the curve L3 or L5 by the control circuit 10 in the manner described above.

In FIGS. 4A through 4C, the rate of deceleration of the rollers 3a, 4a, 5a is of a constant value−V1/a. Thus, the gradients of the righthand inclined portions of the curves L0, L1, L2, L3, L4, L5 are all the same.

Figure 5:
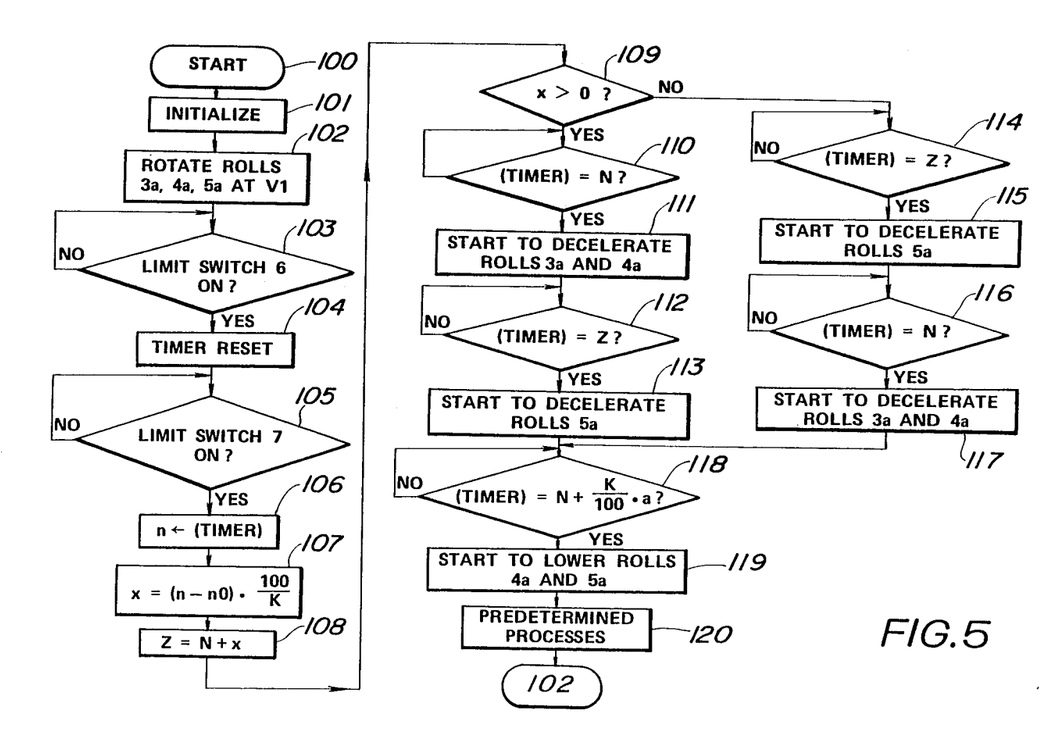
FIG. 5 is a flowchart of an operation sequence executed by a microcomputer unit in the speed control circuit in the feed system shown in FIG. 1.

FIG. 5 shows a flowchart of signal processing by the MCU in the control circuit 10. The MCU executes steps 100 through 120 shown in FIG. 5.

The processsing is started at a step 100 by turning on a power supply or a start switch.

Various circuit elements such as the interface, an internal register, and given variables are initialized in a step 101.

The motors (not shown) for the rollers 3a, 4a, 5a are energized to rotate these rollers 3a, 4a, 5a at a speed V1 in a step 102.

Then, a next decision step 103 ascertains whether the first limit switch 6 has detected the leading end 2c of the lefthand reference glass sheet 2a. If the leading end 2c has been detected by the first limit switch 6, then control goes to a step 104, and if not detected, then control repeatedly executes the step 103 until the leading end 2c is detected by the first limit switch 6.

The step 104 resets the timer in the MCU. The timer may be a commercially available IC timer. After having been reset, the timer continues to count time.

A next decision step 105 ascertains whether the second limit switch 7 has detected the leading end 2d of the righthand reference glass sheet 2b. If the leading end 2d has been detected by the second limit switch 7, then control goes to a step 106, and if not detected, then control repeatedly executes the step 105 until the leading end 2d is detected by the second limit switch 7.

In the step 106, the counted value of the timer is used as the time n shown in FIGS. 4B or 4C.

The step 106 is followed by a step 107 in which $(n-n0)\cdot 100/K$ is calculated, and the product is substituted for x. no and K are constants described above with reference to FIGS. 4A through 4C and are stored in the memory in the control circuit.

$Z=N+x$ is calculated in a step 108, where N is the value N shown in FIG. 4A. Therefore, the rollers 5a start being decelerated upon elapse of a time interval Z from the time t1.

A step 109 ascertains whether the value x determined in the step 107 is positive or not. If x is positive, i.e., if the righthand glass sheet 2b lags behind the lefthand glass sheet 2a as shown in FIGS. 3B and 4B, then control goes to a step 110. If x is not positive, i.e., if the righthand glass sheet 2b leads the lefthand glass sheet 2a as shown in FIGS. 3C and 4C, then control goes to a step 114.

The step 110 checks if the counted value of the timer at this time is equal to N or not, i.e., whether t has reached the time t2 in FIG. 4B. If not, then control repeats the step 110 until the timer value is equal to N. When the timer value reaches the value N, control leaves the step 110 for a step 111.

In the step 111, the motors for the rollers 3a, 4a start being decelerated in order to lower the speed V of the rollers 3a of the first feed path 3 and the rollers 4a of the lefthand second feed path 4.

A next step 112 ascertains whether the counted value of the timer at this time is equal to the time interval Z determined in the step 108, i.e., if t has reached the time t7 in FIG. 4B. If not, then control loops through the step 112. When the timer counts the time interval Z, then control proceeds to a step 113.

The step 113 starts to decelerate the motor for the rollers 5a in order to begin lowering the speed V of the rollers 5a of the righthand second feed path 5. The step 113 is followed by a step 118.

The step 114 checks if the counted value of the timer at this time is equal to the time interval Z determined in the step 108 or not, i.e., whether t has reached the time t9 in FIG. 4C. If not, then control repeats the step 114 until the timer value is equal to Z. When the timer value reaches the value Z, control leaves the step 114 for a step 115.

In the step 115, the motor for the rollers 5a start being decelerated in order to lower the speed V of the rollers 5a of the righthand second feed path 5 at the deceleration $-V1/a$. Control then goes from the step 115 to a step 116.

The step 116 ascertains whether the counted value of the timer at this time is equal to the value N or not, i.e., if t has reached the time t2 in FIG. 4C. If not, then control loops through the step 116. When the timer value reaches the value N, then control proceeds to a step 117.

The step 117 starts to decelerate the motors for the rollers 3a, 4a in order to begin lowering the speed V of the rollers 3a of the first feed path 3 and the rollers 4a of the lefthand second feed path 4. The step 113 is followed by the step 118.

The step 118 ascertains whether the counted value of the timer at this time has reached $N+(K/100)\cdot a$ or not, i.e., whether t has reached the time t3. If not, control loops through the step 118. When the timer value reaches $N+(K/100)\cdot a$, control goes to a step 119.

In the step 119, a lifting/lowering mechanism (not shown) is actuated to lower the rollers 4a, 5a of the second feed paths 4, 5 as shown in FIG. 2C.

After the step 119, control goes to a step 120 in which a predetermined process is carried out such as for elevating the rollers 4a, 5a to the position of FIG. 2A after the glass sheets 2a, 2b have been pressed to shape.

From the step 120, control goes back to the step 102 to repeat the steps 102 through 120 successively as described above.

Figure 6:
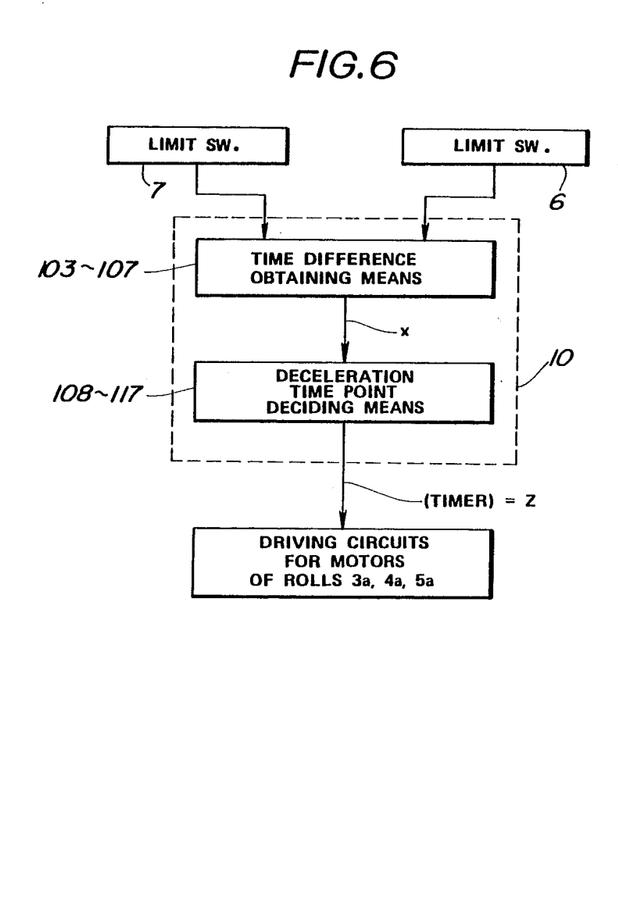
FIG. 6 is a functional block diagram of the speed control circuit.

FIG. 6 is a schematic functional block digram showing the basic functions of the control circuit 10 which can be performed by the combination of the elements of the control circuit 10 and the major steps of the processing operation shown in FIG. 5.

With the method of correcting the attitude of the glass sheets or articles 2a, 2b as described above, the amount of shift S between the glass sheets 2a, 2b on the first feed path 3 in the feed direction F can be compenated for until the glass sheets 2a, 2b reach the respective ring molds 8, 9 which are their target positions over the second feed paths 4, 5.

As mentioned above, the distance D between the limit switches 6, 7 is selected to be greater than a predicted maximum value for the amount of shift S. Practically, therefore, the limit switch 6 detects the glass sheet 2a earlier than the limit switch 7 detects the glass sheet 2b. For more complete control, however, the steps 103 through 106 shown in FIG. 5 may be modified so that either the limit switch 6 or 7 may detect the glass sheet 2a or 2b at first.

In the above embodiment, the limit switches 6, 7 are spaced from each other in the feeding direction F. The amount of shift S between the glass sheets 2a, 2b can be detected, however, even if the limit switches 6, 7 may not be spaced from each other in the feeding direction F.

While the deceleration of the rollers 3a, 4a, 5a is of a constant value $-V1/a$, i.e., the gradients of the inclined portions of the curves L0 through L5 are constant in the above embodiment, the decelerations of the rollers 3a, 4a, 5a may be varied dependent on the amount of shift S.

Figure 7:
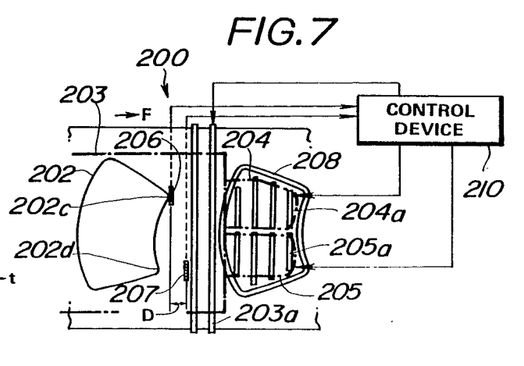
FIG. 7 is a schematic fragmentary plan view, partly in block form, of a feed system for carrying out a method of correcting the attitude of an article being conveyed according to a modification of the present invention, the article being a single glass sheet.

FIG. 7 shows a feed system 200 having a feed speed control device 210. The feed system 200 feeds a single glass sheet 202 and employs rotatable rollers 203a, first and second limit switches 206, 207, rotatable rollers 204a, 205a, and a ring mold 208, instead of the two glass sheets 2a, 2b, the rotatable rollers 3a, the first and second limit switches 6, 7, the rotatable rollers 4a, 5a, and the ring molds 8, 9 in the feed system 50 shown in FIG. 1. The glass sheet 202 has lefthand and righthand leading ends 202c, 202d which correspond respectively to the leading ends 2c, 2d of the glass sheets 2a, 2b. The rotatable rollers 203a constitute a first feed path 203, whereas the rotatable rollers 204a, 205a serve as lefthand and righthand second feed paths 204, 205, respectively, which are parallel to each other and extend in the feeding direction F. The glass sheet 202 is introduced into a heating furnace through its inlet with its leading ends 202c, 202d aligned with each other in the direction normal to the feeding direction F.

The control device 210 controls the speed V of feed by the first feed path 203 and the second feed paths 204, 205 according to the same control sequence as shown in FIGS. 2 through 5. Therefore, the control sequence for the feed system 200 will not be described in detail.

The feed speed control device 210 can compensate for an amount of shift S between the leading ends 202c, 202d of the glass sheet 202 in the feeding direction F in the first feed path 203 until the leading ends 202c, 202d reach the ring mold 208 which serves as the target position over the second feed paths 204, 205 for the glass sheet 202. Thus, even if the glass sheet 202 is displaced from its normal attitude on the first feed path 203, it will be corrected to assume the normal attitude until the glass sheet 202 reaches the ring mold 208.

In the aforesaid embodiments, the glass sheets 2a, 2b; 202 are fed to the pressing ring molds 8, 9; 208 by the first feed path 3; 203 and the second feed paths 4, 5; 204, 205. However, the present invention is not limited to the disclosed field of the art.

While the time t7 or t9 for starting to decelerate the rollers 5a is delayed or advanced with respect to the time t2 for starting to decelerate the rollers 3a, 4a based on the amount of shift S in the above embodiments, the time t7 or t9 may coincide with the time t2, and the rollers 5a may start being decelerated or accelerated on the basis of the amount of shift S.

According to the above embodiments, the leading ends 2c, 2d of the glass sheets 2a, 2b, as detected by the limit swiches, or the leading ends 202c, 202d of the glass sheet 202, as detected by the limit switches, are symmetric with respect to the feeding direction F. However, even a specially shaped article having no axis of symmetry may be corrected in attitude by selecting two related reference parts or locations thereon which can be detected by respective limit switches.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A method of correcting the attitude of an article being conveyed in a feed system including a first feed path for feeding the article in a feeding direction, and two second feed paths contiguous to said first feed path for receiving said article from said first feed path and feeding the article so that a first part and a second part, which are related to each other, of said article will reach a target position for each of the first and second parts, the attitude of the article being corrected until the target positions are reached by compensating for a relative shift beyond a predetermined distance in said feeding direction between said first part and said second part of said article on said first feed path, said method comprising the steps of:

determining the extent of said relative shift by detecting times when said first part and said second part of said article pass respectively through a first measuring point and a second measuring point in said first feed path; and controlling respective speeds of feed by said second feed paths based on the detected extent of the relative shift for thereby causing each of said first part and said second part to reach the target position at a prescribed time.

2. A method according to claim 1, wherein said predetermined distance in said feeding direction between said first part and said second part of said article on said first feed path is zero, said second feed paths extending parallel to each other and in said feeding direction for feeding said first part and said second part of said article respectively to said target positions, and said target positions respectively for said first part and said second part of said article coinciding with each other in said feeding direction.

3. A method according to claim 2, wherein said prescribed times at which said first part and said second part of said article are caused to reach said target positions, respectively, by said second feed paths are the same as each other.

4. A method according to claim 3, wherein said first measuring point and said second measuring point in said first feed path are spaced a prescribed distance from each other in said feeding direction.

5. A method according to claim 4, wherein said second measuring point in said first feed path is displaced said prescribed distance forwardly of said first measuring point in said feeding direction.

6. A method according to claim 5, wherein said extent of said relative shift in said feeding direction between said first part and said second part of said article is determined on the basis of the difference between a time at which said first part passes through said first measuring point and a time at which said second part passes through said second measuring point.

7. A method according to claim 6, wherein the speed of feed by said first feed path and the speed of feed by one of said second feed paths for said first part of said article are the same as each other, said speeds of feed being of a constant value from said time at which said first part passes through said first measuring point to the time for starting to decelerate said first part, and being reduced at a constant deceleration after said time for starting to decelerate said first part, the speed of feed by the other second feed path for said second part of said article being of said constant value after said time at which said second part passes through said second measuring point, and being reduced at said constant deceleration after a time which lags behind or leads said time for starting to decelerate said first part by a time interval based on said extent of the relative shift between said first part and said second part.

8. A method according to claim 7, wherein said article is a glass sheet, said first feed path comprising rotatable rollers disposed perpendicularly to said feeding direction, said target position being provided by a lower mold member for pressing said glass sheet to shape, and said second feed paths comprising rotatable rollers disposed in said lower mold member perpendicularly to said feeding direction.

9. A method according to claim 8, wherein said rotatable rollers of said second feed paths are lowered at a time upon elapse of a prescribed time interval from the time for starting to decelerate said one second feed path, so that said glass sheet is placed on said lower mold member in registry therewith.

10. A method according to claim 1, wherein said article comprises two members having said first part and second part, respectively.

11. A system for correcting the attitude of an article being conveyed, comprising:
 a first feed path for feeding the article in a feeding direction;
 two second feed paths contiguous to said first feed path for receiving said article from said first feed path and feeding the article so that a first part and a second part, which are related to each other, of said article will reach a target position for each of the first and second parts;
 means for determining the extent of said relative shift by detecting times when said first part and said second part of said article pass respectively through a first measuring point and a second measuring point in said first feed path; and
 means for controlling respective speeds of feed by said second feed paths based on the detected extent of the relative shift for thereby causing each of said first part and said second part to reach the target position at a prescribed time, so that the attitude of the article can be corrected until the target positions are reached by compensating for a relative shift beyond a predetermined distance in said feeding direction between said first part and said second part of said article on said first feed path.

* * * * *

UNITED STATES PATENT AND TRADEMARK OFFICE
CERTIFICATE OF CORRECTION

PATENT NO. : 4,753,668
DATED      : June 28, 1988
INVENTOR(S): Seiichiro Honjo et al It is certified that error appears in the above-identified patent and that said Letters Patent is hereby corrected as shown below:

Column 2, line 56, "plan" should read --plane--.
Column 3, line 8,  "plan" should read --plane--.
Column 3, line 68, "roller 5" should read --roller 5a--.
Column 3, line 68, "feed path 5a" should read --feed path 5--.
Column 3, line 68, "is" should read --are--.
Column 4, line 48, "3a, 3a" should read --3a--.
Column 5, line 23, "$\overline{Q_3Q_7}=\overline{Q_3Q_7}$" should read --$\overline{Q_3Q_7}=\overline{Q_2Q_6}$--.
Column 6, line 3,  "(K/100)a · (k/100)" should read --(K/100)a · (K/100)--.
Column 6, line 15, "simplifiefd" should read --simplified--.
Column 7, line 22, "no" should read --n0--.
Column 8, line 27, "digram" should read --diagram--.
Column 9, line 40, "swiches" should read --switches--.

Signed and Sealed this

Fourth Day of April, 1989

*Attest:*

DONALD J. QUIGG

*Attesting Officer*  *Commissioner of Patents and Trademarks*